US 7,428,809 B2

(12) United States Patent
Wickert et al.

(10) Patent No.: US 7,428,809 B2
(45) Date of Patent: Sep. 30, 2008

(54) METHOD FOR OPERATING AN INTERNAL COMBUSTION ENGINE AND A DEVICE FOR CARRYING OUT THE METHOD

(75) Inventors: Stefan Wickert, Albershausen (DE); Torsten Handler, Stuttgart (DE); Dirk Samuelsen, Ludwigsburg (DE); Christian Walz, Durmersheim (DE)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 11/236,183

(22) Filed: Sep. 26, 2005

(65) Prior Publication Data

US 2006/0080952 A1    Apr. 20, 2006

(30) Foreign Application Priority Data

Sep. 25, 2004    (DE)    ........................ 10 2004 046 639

(51) Int. Cl.
*F01N 3/00*    (2006.01)
*F01N 3/10*    (2006.01)
*F02M 25/06*    (2006.01)

(52) U.S. Cl. ............................. 60/286; 60/274; 60/275; 60/278; 60/285; 60/295; 60/299

(58) Field of Classification Search .................... 60/274, 60/275, 278, 285, 286, 295, 299
See application file for complete search history.

(56) References Cited

U.S. PATENT DOCUMENTS

| | | | | |
|---|---|---|---|---|
| 4,751,054 A | * | 6/1988 | Watanabe | .................... 422/111 |
| 5,369,956 A | * | 12/1994 | Daudel et al. | ................. 60/276 |
| 5,540,047 A | * | 7/1996 | Dahlheim et al. | ............. 60/274 |
| 6,119,448 A | * | 9/2000 | Emmerling et al. | ........... 60/274 |
| 6,247,303 B1 | * | 6/2001 | Broer et al. | .................... 60/274 |
| 6,295,809 B1 | * | 10/2001 | Hammerle et al. | ............ 60/286 |
| 6,305,160 B1 | * | 10/2001 | Hammerle et al. | ............ 60/274 |
| 6,532,736 B2 | * | 3/2003 | Hammerle et al. | ............ 60/286 |
| 6,546,720 B2 | * | 4/2003 | van Nieuwstadt | ............ 60/286 |
| 6,882,929 B2 | * | 4/2005 | Liang et al. | ................. 701/115 |
| 6,981,368 B2 | * | 1/2006 | van Nieuwstadt et al. | ..... 60/277 |
| 6,996,975 B2 | * | 2/2006 | Radhamohan et al. | ........ 60/286 |
| 7,067,319 B2 | * | 6/2006 | Wills et al. | ..................... 436/37 |
| 2003/0216855 A1 | | 11/2003 | Liang et al. | |
| 2004/0098974 A1 | | 5/2004 | Nieuwstadt et al. | |
| 2006/0010857 A1 | * | 1/2006 | Hu et al. | ........................ 60/286 |
| 2006/0096278 A1 | * | 5/2006 | Lueders et al. | ................. 60/286 |

FOREIGN PATENT DOCUMENTS

DE    197 39 848    3/1999

(Continued)

*Primary Examiner*—Thomas Denion
*Assistant Examiner*—Loren Edwards
(74) *Attorney, Agent, or Firm*—Kenyon & Kenyon LLP

(57) ABSTRACT

A method for operating an internal combustion engine; in the exhaust area of this engine there is at least one catalytic converter and downstream from the catalytic converter there is an NOx sensor. A device for carrying out this method is also provided. The NOx sensor has a cross-sensitivity to a reagent needed in the catalytic converter. In predefined operating states of the internal combustion engine, e.g., idling and/or overrun, a selection signal is supplied; when this selection signal occurs, the sensor signal supplied by the NOx sensor is interpreted as at least a measure of the reagent leakage.

8 Claims, 1 Drawing Sheet

FOREIGN PATENT DOCUMENTS

| | | | | | |
|---|---|---|---|---|---|
| DE | 199 03 439 | 8/2000 | EP | 0 820 799 | 1/1998 |
| DE | 199 62 912 | 7/2001 | WO | WO 99/43420 | 9/1999 |
| DE | 199 60 731 | 12/2003 | | | |

* cited by examiner

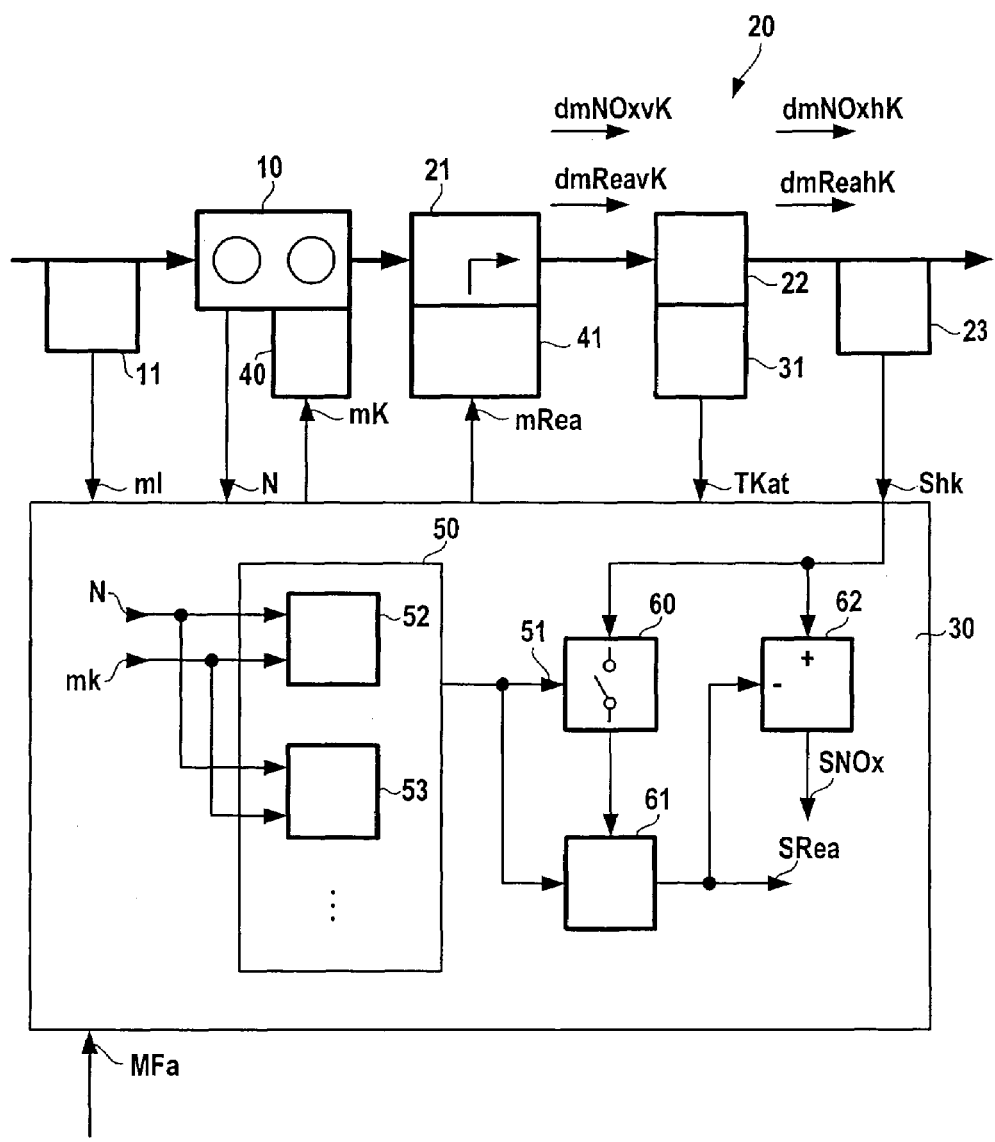

METHOD FOR OPERATING AN INTERNAL COMBUSTION ENGINE AND A DEVICE FOR CARRYING OUT THE METHOD

FIELD OF THE INVENTION

The present invention is directed to a method for operating an internal combustion engine, having at least one catalytic converter, an NOx sensor and a device provided in the exhaust area for carrying out the method.

BACKGROUND INFORMATION

German Patent Application No. DE 199 03 439 describes a method and a device for operating an internal combustion engine in whose exhaust area an SCR (selective catalytic reduction) catalytic converter is provided which uses a reagent to reduce nitrogen oxides in the exhaust gas of an internal combustion engine to nitrogen. The reagent is preferably metered as a function of performance characteristics of the internal combustion engine such as the speed and the quantity of fuel injected. In addition, fuel is preferably metered based on operating parameters of the exhaust gas, such as the exhaust gas temperature or the operating temperature of the SCR catalytic converter.

For example, the reducing agent ammonia, which may be obtained from a urea-water solution, is used as the reagent. The reagent or precursors of the reagent must be metered carefully. If the amount metered is too low, this results in nitrogen oxides no longer being completely reduced in the SCR catalytic converter. If the metering is too high, this results in leakage of reagent, which may result in unnecessarily high reagent consumption as well as an unpleasant odor problem, depending on the nature of the reagent. In addition, another factor to be taken into account is that ammonia is toxic.

German Patent Application No. DE 197 39 848 describes a procedure using which crude NOx emissions of an internal combustion engine may be calculated at least approximately from known performance characteristics of the engine. The starting point is an engine characteristics map, which is based on the speed and torque of the engine. In addition, corrections may also be provided, e.g., as a function of the lambda value.

German Patent Application No. DE 10 2004 031 624 (not a prior publication) describes a method for operating an SCR catalytic converter used for purifying the exhaust gas of an internal combustion engine; with this method, control or regulation of the reagent filling level in the SCR catalytic converter is provided at a predefined setpoint storage volume. The targeted specification of the setpoint storage volume ensures that an adequate quantity of reagent for the most thorough possible elimination of crude NOx emissions produced by the internal combustion engine is available in non-steady states of the engine while avoiding reagent leakage.

The reagent filling level of the SCR catalytic converter is determined on the basis of a catalytic converter model that takes into account the NOx mass flow entering the SCR catalytic converter, the NOx mass flow leaving the SCR catalytic converter, the catalytic converter temperature and, if necessary, the reagent leakage. The maximum possible reagent filling level of the SCR catalytic converter depends in particular on the operating temperature of the SCR catalytic converter. The maximum possible reagent filling level is highest at low operating temperatures and drops toward lower values with increasing operating temperatures. The efficiency of the SCR catalytic converter depends on the catalytic activity, which is also low at low operating temperatures, passing through a maximum with an increase in operating temperature and then dropping again with a further increase in operating temperature.

German Patent No. DE 199 60 731 describes an NOx sensor which detects the NOx concentration in an exhaust gas stream of an internal combustion engine. The circuit system provided for operating the NOx sensor permits an adjustment of the potentials with a very small offset relative to one another.

German Patent No. DE 199 62 912 also describes an NOx sensor for detecting the NOx concentration in an exhaust gas stream. A circuit system changes the voltages supplied as a function of the currents flowing in the electrode leads or the currents flowing between the electrodes in such a way that the voltages applied to the electrodes inside the sensor have the predefined setpoints.

The NOx sensors described here have multiple chambers interconnected through the diffusion barriers. The $O_2$ concentration is reduced to a predetermined value in the first chamber by a first electrolytic oxygen pumping cell. Conditions in the first chamber such as temperature, catalytic effect of the electrode material and pumping voltage are selected to prevent decomposition of the NOx into $N_2$ and $O_2$. In the second chamber, $O_2$ is also pumped out. In the second chamber, $O_2$ is again pumped out at a second pump electrode down to a very low $O_2$ concentration. This promotes an NOx reduction reaction. Electrochemical reduction then takes place at a third pumping electrode. The intensity of the pumping current across the third electrode in the second chamber may thus be used as a measure of the NOx concentration in the exhaust gas. A third chamber is connected to ambient air and contains an air reference electrode. Known amperometric dual-chamber NOx sensors have a cross-sensitivity to ammonia ($NH_3$) due to the measurement principle. Ammonia present in the exhaust gas, as an example of a reagent, results in distortion of the sensor signal due to the reaction $4NH_3+5O_2 \rightarrow 4NO+ 6H_2O$.

An object of the present invention is to provide a method for operating an internal combustion engine in whose exhaust area at least one catalytic converter and an NOx sensor are provided and a device for carrying out the method using which the least possible reagent leakage of a reagent required in the catalytic converter occurs.

SUMMARY OF THE INVENTION

The method according to the present invention is directed to at least one catalytic converter situated in the exhaust area of the internal combustion engine and at least one NOx sensor situated downstream from the catalytic converter. The NOx sensor has a cross-sensitivity to a reagent which is required in the catalytic converter. According to the present invention, in predefined operating states of the internal combustion engine, a selection signal is made available. When this signal occurs, the sensor signal provided by the NOx sensor is interpreted at least as a measure of the reagent concentration which exists downstream from the catalytic converter and referred to below as reagent leakage.

The method according to the present invention makes it possible to make use of the cross-sensitivity of an NOx sensor, which is undesirable per se. The choice of predefined operating states of the internal combustion engine is preferably made from the standpoint that the engine has little or no crude NOx emissions in those states so that the sensor signal supplied by the NOx sensor occurs at least approximately only because of the cross-sensitivity and thus reflects at least approximately a measure of reagent leakage.

According to one embodiment, idling is provided as a predefined operating state of the internal combustion engine. Idling is preferably detected by the fact that the engine speed is in a predefinable rpm range and the quantity of fuel supplied to the engine is below a predefined fuel quantity threshold value or is within a predefined range.

According to one embodiment, overrun is provided as a predefined operating state of the internal combustion engine. Overrun is preferably detected by the fact that the speed of the internal combustion engine is above a predefined rpm threshold value and the engine is not receiving any fuel.

The internal combustion engine speed and a fuel signal are available anyway so that no additional sensors are necessary.

The catalytic converter is preferably designed as an SCR catalytic converter which converts the crude NOx emissions of the internal combustion engine into less harmful compounds using a reagent. Ammonia is an example of the reagent provided. The reagent may either be introduced directly into the exhaust track upstream from the catalytic converter or supplied internally within the engine. When ammonia is provided as the reagent, for example, it may be obtained from a starting material such as a urea-water solution or ammonium carbamate.

The device according to the present invention for carrying out the method relates to a control unit equipped for carrying out the method.

The control unit contains in particular an operating state detection means which provides the selection signal when predefined operating states of the engine occur. When this signal occurs, the sensor signal detected by the NOx sensor is analyzed at least as a measure of reagent leakage.

The control unit preferably has an electric memory in which the method steps are stored as a computer program.

BRIEF DESCRIPTION OF THE DRAWING

The FIGURE shows a technical environment in which a method according to the present invention is carried out.

DETAILED DESCRIPTION

The Figure shows an internal combustion engine 10 having an air sensor 11 in its intake area and a reagent introducing device 21, a catalytic converter 22 and an NOx sensor 23 in its exhaust area 20.

Upstream from catalytic converter 22, there are crude NOx emissions dmNOxvK of internal combustion engine 10 and a reagent stream dmReavK. Downstream from catalytic converter 22, there are an NOx concentration dmNOxhK and a reagent leakage dmReahK.

Air sensor 11 supplies a control unit 30 with an air signal ml, internal combustion engine 10 supplies a speed N, a temperature sensor 31 provided for catalytic converter 22 supplies a catalytic converter temperature TKat, NOx sensor 23 supplies a sensor signal ShK and an accelerator pedal (not shown) of a motor vehicle (also not shown) supplies a torque setpoint MFa.

Control unit 30 delivers a fuel signal mK to a fuel metering device 40 provided for internal combustion engine 10 and a reagent signal mRea to a metering valve 41 provided for reagent introducing device 21.

Control unit 30 contains an operating state detection means 50 which receives speed N and fuel signal mK. Operating state detection means 50, which includes an overrun detection means 52 and an idling detection means 53, supplies a selection signal 51.

Selection signal 51 is delivered to a switch 60 and to a memory 61. Switch 60 connects sensor signal ShK to memory 61 which supplies reagent leakage signal SRea that is supplied to an adder 62.

Adder 62 subtracts reagent leakage signal SRea from sensor signal ShK and supplies an NOx signal SNOx.

The system depicted in the Figure operates as follows:

Control unit 30 determines fuel signal mK as a function of torque setpoint MFa and preferably also as a function of air signal ml and/or speed N. Torque setpoint MFa corresponds essentially to the intent of a driver of a motor vehicle (not shown) in which internal combustion engine 10 is used as a drive.

Depending on the operating state of internal combustion engine 10, more or less high crude NOx emissions dmNOxvK occur and are to be eliminated as thoroughly as possible by catalytic converter 22. Catalytic converter 22 is preferably designed as an SCR catalytic converter which supports reaction of NOx with a reagent which is introduced into exhaust area 20 using reagent introducing device 21 or, if necessary, is made available internally within the engine. In addition to catalytic converter 22, other catalytic converters (not shown) and/or a particle filter may be provided in exhaust area 20.

Instead of the reagent, a precursor may be provided. In the case of ammonia as the reagent, a urea-water solution or ammonium carbamate may be provided as the precursor.

In being introduced into exhaust area 20, the quantity of reagent and/or the reagent stream is set by metering valve 41 which is connected to a supply container (not shown). Control unit 30 defines the opening cross section of metering valve 41, using metering signal mRea, for example.

The metering of the reagent with metering signal mRead is determined, for example, on the basis of crude NOx emissions dmNOxvK of internal combustion engine 10 and is optionally defined as a function of the temperature of SCR catalytic converter 22. Crude NOx emissions dmNOxvK of internal combustion engine 10 depend on the operating point of engine 10, which is determined at least by the torque of engine 10, which corresponds mostly to fuel signal mK. Speed N is preferably also taken into account here. Including catalytic converter temperature TKat takes into account the temperature-dependent reagent storage capacity of SCR catalytic converter 22.

Temperature sensor 31, provided for determining the temperature, may be situated upstream from SCR catalytic converter 22, directly on SCR catalytic converter 22, or downstream from SCR catalytic converter 22. It is important here that the signal supplied by temperature sensor 31 must at least reflect a measure of catalytic converter temperature TKat. Instead of a temperature measurement, an estimate of catalytic converter temperature TKat may also be provided.

Depending on crude NOx emissions dmNOxvK, reagent stream dmReavK upstream from SCR catalytic converter 22 and the operating conditions of SCR catalytic converter 22, NOx concentration dmNOxhK and reagent leakage dmReahK downstream from SCR catalytic converter 22 may occur. Both exhaust components are undesirable. Overmetering of reagent minimizes NOx concentration dmNOxhK. Depending on the reagent storage capacity currently available at the given operating point of SCR catalytic converter 22, reagent leakage dmReahK cannot be ruled out completely. Metering of reagent is optimizable on the basis of a measurement of reagent leakage dmReahK.

Reagent leakage dmReahK is detectable in principle by using a special reagent sensor. To minimize the cost of mass production, an additional sensor is not desirable. The procedure according to the present invention makes use of the fact that the NOx sensors described in the related art cited above have a cross-sensitivity with respect to the reagent. The cause of this cross-sensitivity has already been described above. Cross-sensitivity is further supported by operating NOx sensor 23 at elevated temperatures by heating the catalytically active surface of the noble metal electrodes. Conversion of ammonia with oxygen to nitrogen monoxide and water results in elevated NOx content in NOx sensor 23, so that sensor signal ShK of NOx sensor 23 reflects the sum of NOx concentration dmNOxhK and reagent leakage dmReahK.

The procedure according to the present invention involves determining the operating states of internal combustion engine 10 in which engine 10 has the lowest possible crude NOx emissions dmNOxvK. In these operating states, sensor signal ShK largely reflects reagent leakage dmReahK by eliminating the NOx concentration dmNOxhK.

To determine certain operating states of internal combustion engine 10, operating state detection means 50 is provided, making available speed N and fuel signal mK, for example. Suitable operating states in which little or no NOx emissions dmNOxvK occur include idling of engine 10 and overrun in particular.

To detect overrun, overrun detection means 52 is provided, detecting overrun of engine 10 by the fact that speed N exceeds a predefined lower rpm limit and fuel signal mK is zero. To detect idling of engine 10, idling detection means 53 is provided, detecting idling, e.g., by the fact that speed N is within a predefined range and fuel signal mK is below a predefined fuel signal threshold. It is also possible to check on whether fuel signal mK is within a predefined range.

If operating state detection means 50 has detected a selected operating state of internal combustion engine 10, then operating state detection means 50 supplies selection signal 51 which signals that sensor signal ShK of NOx sensor 23 is at least approximately only reflecting reagent leakage dmReahK.

Selection signal 51 is made available to switch 60 which supplies sensor signal ShK at its output and relays it to memory 61. Memory 61 is preferably provided to store sensor signal ShK, reflecting reagent leakage dmReahK, at least until again reaching a suitable operating state in which the stored value may be updated.

In the exemplary embodiment presented here, memory 61 supplies reagent leakage signal SRea which has already occurred at the output of switch 60 if selection signal 51 has closed switch 60. Reagent leakage signal SRea may be used to set metering signal mRea.

Reagent leakage signal SRea may also be used for at least approximate determination of NOx concentration dmNOxhK downstream from SCR catalytic converter 22. If the operating conditions of the internal combustion engine are outside the suitable conditions, sensor signal ShK will reflect the sum of NOx concentration dmNOxhK and reagent leakage dmReahK. By forming a difference in adder 62, which subtracts reagent leakage signal SRea from sensor signal ShK, NOx signal SNOx is obtained which at least approximately reflects NOx concentration dmNOxhK during the entire operation of internal combustion engine 10.

NOx signal SNOx may also be used to define metering signal mRea, e.g., as part of a regulation of the reagent filling level in SCR catalytic converter 22, as described in greater detail in the related art cited above.

What is claimed is:

1. A method for operating an internal combustion engine, an exhaust area of the engine having at least one catalytic converter, the method comprising:

detecting a reagent needed in the catalytic converter by an NOx sensor situated downstream from the catalytic converter, the NOx sensor having a cross-sensitivity to the reagent;

activating a selection signal during predefined operating states of the internal combustion engine, so that when the selection signal occurs, a sensor signal supplied by the NOx sensor is interpreted as at least a measure of a reagent leakage; and deactivating the selection signal when the internal combustion engine is no longer in one of the predefined operating states, wherein the one of the predefined operating states is idling.

2. The method according to claim 1, further comprising storing the sensor signal reflecting the reagent leakage in a memory when the selection signal occurs.

3. The method according to claim 2, further comprising subtracting the measure of the reagent leakage from the sensor signal to obtain a measure for a measured NOx concentration downstream from the catalytic converter.

4. The method according to claim 1, wherein the catalytic converter is an SCR catalytic converter.

5. The method according to claim 4, wherein the reagent includes ammonia.

6. A method for operating an internal combustion engine, an exhaust area of the engine having at least one catalytic converter, the method comprising:

detecting a reagent needed in the catalytic converter by an NOx sensor situated downstream from the catalytic converter, the NOx sensor having a cross-sensitivity to the reagent;

activating a selection signal during predefined operating states of the internal combustion engine, so that when the selection signal occurs, a sensor signal supplied by the NOx sensor is interpreted as at least a measure of a reagent leakage; and deactivating the selection signal when the internal combustion engine is no longer in one of the predefined operating states, wherein the one of the predefined operating states is overrun of the internal combustion engine.

7. A device for operating an internal combustion engine, an exhaust area of the engine having at least one catalytic converter, the device comprising at least one control unit for performing the following:

detecting a reagent needed in the catalytic converter by an NOx sensor situated downstream from the catalytic converter, the NOx sensor having a cross-sensitivity to the reagent;

activating a selection signal during predefined operating states of the internal combustion engine, so that when the selection signal occurs, a sensor signal supplied by the NOx sensor is interpreted as at least a measure of a reagent leakage; and deactivating the selection signal when the internal combustion engine is no longer in one of the predefined operating states, wherein the one of the predefined operating states is one of idling or overrun of the internal combustion engine.

8. The device according to claim 7, wherein the control unit includes an operating state detection means for supplying the selection signal when predefined operating states of the internal combustion engine occur, so that when the selection signal occurs, the sensor signal supplied by the NOx sensor is interpreted as at least a measure of the reagent leakage.

* * * * *